June 15, 1965

A. G. BODINE 3,189,092

PETROLEUM WELL TREATMENT BY HIGH POWER ACOUSTIC
WAVES TO FRACTURE THE PRODUCING FORMATION

Filed Oct. 24, 1958

INVENTOR.
ALBERT G. BODINE
BY
ATTORNEY

*INVENTOR.*
ALBERT G. BODINE 3,189,092
PETROLEUM WELL TREATMENT BY HIGH
POWER ACOUSTIC WAVES TO FRACTURE
THE PRODUCING FORMATION
Albert G. Bodine, Sherman Oaks, Calif.
(7877 Woodley Ave., Van Nuys, Calif.)
Filed Oct. 24, 1958, Ser. No. 769,342
6 Claims. (Cl. 166—42)

This invention relates generally to petroleum well treatment and more particularly to improvement of production from earthen petroleum reservoirs of low permeability by fracturing the petroleum bearing strata. The present invention accomplishes this purpose by use of acoustic waves of such extreme power as to cause the formation to undergo a periodic stress beyond its elastic endurance limit and to fail by elastic fatigue. This application is a continuation-in-part of my parent application Serial No. 437,078, filed June 16, 1954, allowed May 9, 1958, now Patent No. 2,871,943.

An oil reservoir in the ground is simply a region of porous oil-soaked rock or sand. Formation porosity refers to the total volume of voids in which oil may accumulate. Permeability refers to the ability of the formation to permit oil flow therethrough. Small pore size, and especially the absence of good joining channels between pores or voids, results in low permeability. Permeability largely determines the daily oil production rate of the well, and to a considerable degree determines how long the well will have a reasonable daily production.

A great many attempts have been made to increase artificially the production rate from a low permeability formation around a well bore. A number of these, and their limitations, were mentioned in my said parent application, including the relatively recent process known as hydraulic fracturing; and said application is incorporated herein by reference for purpose of discussion of these prior procedures.

The general object of the present invention is the provision of a process and apparatus involving the use of high intensity acoustic waves to fracture low permeability rock, provide new exposure area, and open up new drainage channels to the well.

Rock material will of course transmit acoustic (elastic) waves, and will continue to do so indefinitely at ordinary wave amplitudes, such as are set up with certain prior processes used for various purposes. In such elastic wave transmission, alternating deformation waves of compression and expansion travel through the rock. As stated, certain prior procedures for other purposes have made use of such waves at a relatively low order of amplitude. I have discovered that if the pressure amplitude of such alternating deformation waves is very materially raised to a certain threshold level, the rock is then "cyclically overstressed," and under such conditions, fatigue failure and resulting cracking of the rock occurs within a finite time period. I have found that there is a threshold value of acoustic wave pressure amplitude for any given rock, and a set of local conditions surrounding the same, at which the rock is stressed beyond its strength or endurance limit, and if the wave is maintained at such amplitude, fatigue failure and fracturing will ensue. Beyond such threshold value, fatigue failure occurs more promptly with higher and higher wave amplitudes. The present invention is based on my discovery that acoustic waves established in the formation at or above a certain threshold value place the rock media under more cyclic stress than its physical cohesive properties or tensile strength can endure, sometimes referred to herein as overstressing the rock, and that under such conditions the rock proceeds to fracture by the process of fatigue failure. I also define the threshold level of acoustic wave pressure amplitude which I have found to be necessary for fracturing of the rock by such fatigue failure as "acoustic formation-failure stress amplitude." It will further be understood that the expression "acoustic" is used herein in its technical meaning as understood by those skilled in the art, without implied limitation to the audible frequency range.

This present process is not to be confused with the acoustic process of "unclogging" a formation by transmitting sound waves therethrough. In my reissue Patent Re. 23,381, I disclosed and claimed an acoustic process which improves the permeability of oil bearing formations by transmission of sound waves therethrough. This process was directed to permeability improvement only, and operated by "unclogging" the formation. That is to say, the sound waves acted to displace elements or materials such as gas bubbles, clay, mud, etc., tending to clog the pores of the formation, or the flow channels between oil containing voids. This prior patent did not contemplate or suggest the present process which consists in the use of acoustic waves so powerful as to actually fracture the formation, and make a physical change in the rock itself, so as to provide new surface exposure, and a multiplicity of new drainage channels to the well bore. It will be seen that the instant process, while incidentally including permeability improvement in its accomplishments (in the technical sense of improving flow through the pores of integral blocks of formation), goes far beyond such operation and, by passing the wave amplitude level at which the formation is stressed beyond its physical strength characteristics, enters the realm wherein the formation is actually fractured by the transmitted acoustic waves. To enter this field, much higher acoustic power must be delivered to the formation.

Sedimentary rocks are made up of successive relatively thick beds or strata of differing composition, such as sandstone, sand, clay, shale, limestone, etc. These thick beds usually reveal a large number of bedding planes. Thus a given bed, e.g., a sandstone, will ordinarily be composed of successive layers laid down under differing conditions, often separated by bands of clay, shale, or other material. The boundaries between successive beds of differing composition constitute planes of easiest separation, along which cracks or fractures may sometimes develop naturally, and which are most easily opened up by various so-called fracturing procedures. The successive layers are kept normally under high compression by the weight of the over-burden. An aim of the present invention is to periodically elastically move or "work" these highly compressed and initially bonded layers, causing them to "fracture" and/or separate by subjecting them to extreme periodic elastic deformation stresses under the influence of powerful acoustic waves transmitted to and through them from a powerful acoustic wave radiator positioned in the bore hole. The fracturing can take place in either or both of two ways, first, separation and relative displacement of adjacent beds or layers, and second, fracturing of homogeneous beds by cyclic overstress of the formation to the point of fatigue failure. The acoustic waves will, in such manner, also result in vertical cracks due to the stress geometry of a vertical bore.

According to one illustrative practice of the invention, the acoustic waves are transmitted from the radiator to the formation via a coupling liquid maintained in the well bore under a suitable hydraulic pressure. This coupling liquid contacts both the radiator and the formation, and enters all available cracks, fissures and fractures therein, so as to provide a liquid wave transmission medium between the radiator and all exposed surfaces of the formation. This coupling liquid has a specific acoustic impedance $\rho c$ (where $\rho$ is density and $c$ is the velocity of sound) which, while not as high as that of the formation, is nevertheless high enough that a large percentage of the wave energy transmitted through it to the formation is transmitted on into the formation. Some of the wave energy is of course reflected at the surface of the formation. At this reflecting boundary, a stress or pressure cycle is set up, acting to periodically move or reciprocate the surface of the formation through a definite displacement amplitude. Such cyclic movement of a bounding surface of the formation launches alternating elastic deformation waves which are propagated on through the formation with the speed of sound. Assuming a cylic stress of sufficient magnitude at the point of incidence of the acoustic wave on the formation, and/or waves transmitted in the rock which are of sufficient magnitude to cyclically over-stress the rock, the rock material is subject to fatigue failure and fracture. Fracturing at the boundary planes between adjacent strata, with consequent loosening and separation of strata, is also produced. For example, the characteristic acoustic impedance of sedimentary rock has a marked discontinunity at the boundary planes between different strata, and at such planes, therefore, acoustic waves in the formation are substantially reflected rather than being fully transmitted into the adjacent strata. Accordingly, a given stratum within which a powerful sound wave is being propagated will undergo cyclic elastic deformation movements relative to adjacent strata, thus creating cyclic forces between stata which exceed the strength of the bond therebetween, thereby causing fractures along these bounding planes. Also, assuming the case of waves set up in two adjacent strata of different acoustic impedance, the waves will travel at differing velocities, and the resulting phase difference on opposite sides of the bounding plane results in shearing forces which exceed the strength of the bond between the strata and thereby cause fracture or separation.

With respect to the above-mentioned acoustic coupling liquid, it is very important that contact with the formation to be fractured be attained and that the liquid be made to follow up changes in geometry as fractures are generated, because the transmission of acoustic fracturing energy to the formation depends upon the presence of the liquid body. It is also generally desirable that the coupling liquid be maintained under a considerable hydraulic head. Every formation within the earth has what has come to be called its hydraulic "formation breakdown pressure." This is the pressure at which hydraulic liquid working into a crack in the formation will open up the crack by overcoming the pressure of the earthen overburden, the tensile strength of local earthen material at its weakest point, and various other somewhat indeterminate factors. The "formation breakdown pressure" is usually estimated as approximately equal, in pounds per square inch, to the depth of the formation in feet. It is generally somewhat less than the actual weight of the overburden. For reasons which will appear hereinafter, in my acoustic process I generally prefer that the acoustic coupling liquid be maintained at a hydraulic pressure less than hydraulic "formation breakdown pressure." The necessary pressure can often be attained by the hydrostatic head of a column of liquid filling the well hole to the ground surface. If such hydrostatic head proves to be inadequate, additional pressure can be applied by means of a suitable pressure source at the ground surface.

Assuming a hydrostatic head on the coupling liquid, as described, a pressure wave is radiated into the liquid, and it will be seen that this pressure wave will be superimposed on, i.e., will comprise alternate positive and negative pressure half-cycles relative to, the maintained hydrostatic pressure. The sound wave is thus transmitted to the exposed wall surfaces of the formation, to be thence propagated through the formation. Within the formation, the sound wave involves alternate positive and negative pressure half-cycles relative to the compressive pressure normally existing within the formation owing to the overburden.

An important feature of the invention is the development of elastic or acoustic wave cycles of sufficient wave-pressure amplitude to equal or exceed the magnitude which I define as "acoustic formation-failure stress amplitude." Within the coupling liquid and at the formation wall surface, this amplitude is that which will elastically vibrate the formation sufficiently to overstress it and cause it to fail by elastic fatigue. Within the formation, this amplitude is that which is sufficient to overstress the formation and cause it to fail or fracture by elastic fatigue. Thus, the acoustic waves impinging upon and/or transmitted through the formation subject the formation to a cyclic elastic stress, and when this stress is of sufficient magnitude, defined herein as "acoustic formation-failure stress amplitude," the rock is cyclically stressed beyond its fatigue strength at a frequency of many times per second, and fails of fractures as the inevitable consequence.

The feature of the foregoing paragraph may also be expressed, and the threshold limit of the present invention demarked, in terms of the "endurance limit" of the material. This expression is used by engineers to denote the maximum repetitive stress that a material will withstand indefinitely without fatigue failure, and I have found that the same concept is applicable in explaining the present invention. According to this concept, the previously-defined acoustic formation-failure stress amplitude denotes a repetitive stress which exceeds the endurance limit of the material. A plotted curve using repetitive stress amplitude as ordinates, and life (in cycles) to fatigue failure as abcissa, is convex downwardly and becomes horizontal or substantially so at some value of repetitive stress. This particular stress value, called the endrance limit, is taken as the value of indefinite life. The condition for the present invention is then the use of an acoustic wave of amplitude creating a repetitive stress in the structure to be fractured in excess of such value for indefinite life. Obviously, of course, it is preferable to excess the endurance limit for the material rather substantially so that the desired fatigue failure will occur with reasonable rapidity. A species of the broad invention specifically claimed herein comprises the use of acoustic waves which are of non-linear or asymmetric wave form, characterized by periodic high pressure peaks of steep-wave front, preferably of amplitude substantially exceeding the endurance limit of the formation. Such wave form may be produced by an apparatus in accordance with the invention capable of cavitating the coupling liquid, and so generating a shock wave which possesses the desired steep positive wave front. Such a non-linear wave form is particularly effective in formation fracturing by elastic fatigue failure. It has been noted hereinabove that the formation may, in accordance with the invention, be fractured in either of two general ways, first, fracture within the confines of a bed or stratum, and second, fracture along the interface bond betwen adjacent strata. It will be clear that in both cases, the acoustic waves transmitted through the formation must be of sufficient amplitude to repetitively stress the material to be fractured beyond the endurance limit thereof. In the first case, the endurance limit of the rock within a bed is to be exceeded. In the second case, the fracture is to be of the interface bond; and the amplitude of the wave is accordingly to be such as to set up a stress exceeding the strength of the interface bond, i.e., of the endurance limit of the formation along this interface bond. Another manner of viewing the same matter is as follows: The formation will in general contain planes of weakness, of lower endurance limit than that of surrounding material. It is along such planes that the fractures made must occur. Such planes exist within beds of the formation, as well as along interface bonds between beds. In either case, to accomplish fracture, there is set up a cyclic wave stress which exceeds the endurance limit of the material along such a plane, and fracturing therealong must ensue. It may incidentally be observed that when fracture of the formation does result from transmission of acoustic waves therethrough, it may conclusively be presumed that the endurance limit of the formation along the site of the fracture made was exceeded by the pressure amplitude of the wave. Moreover, and by the same token, if in any case it is found, following treatment of the formation, that the formation has not fractured, the operator will known that the endurance limit was not exceeded, and that it is necessary to increase the pressure amplitude of the wave until that amplitude does exceed the endurance limit, as signified by attainment of fracturing.

It should be clear that this elastic fatigue failure is a phenomena entirely different from that of so-called fracturing by hydraulic pumping to a pressure equal to "hydraulic formation breakdown pressure." The latter refers simply to application of sufficient pressure to bodily lift the formation against the weight of the overburden. The present process consists in subjecting the treated formation to a cyclic stress of amplitude sufficient to cause formation breakdown by elastic fatigue, and this stress value may be a number which is less than hydraulic formation breakdown pressure. The physical property of the locally treated rock itself leading to fracturing in the practice of the present invention is thus its susceptibility to fatigue failure under periodic elastic stress—a property not previously made use of in formation fracturing. The defined acoustic formation-failure stress amplitude has a definite threshold value for any given rock, but it will be seen to be quite different from hydraulic breakdown pressure, because, for one thing, it is not primarily a function of depth. It is sometimes feasible, depending upon local conditions, e.g., overburden pressure, geometry of formation, or power of sound wave generator, to produce pressure waves in the formation of such large swing as will develop periodic tensile stresses in the formation, leading to even more rapid fatigue failure.

The desirability of maintaining adequate hydrostatic pressure on the coupling liquid used between the acoustic wave radiator and the formation has already been mentioned. This coupling liquid is used, first, to provide an effective acoustic coupling medium between the radiator and the formation, of impedance sufficiently high with respect to that of the formation to assure adequate coupling and wave energy transmission. At this point it might be mentioned that the specific impedance of the coupling liquid may be measurably improved by incorporating therein a proportion of sand or other solid particles. It will be clear that sufficient of this coupling liquid, under sufficient hydraulic pressure, must be provided to assure that it will follow up the extensive cracks and fractures that develop in the progress of the process, so as to maintain or develop the transmission of high energy acoustic waves from the radiator to newly exposed surfaces of the formation. Maintenance of the coupling fluid under sufficient hydraulic pressure is also important from an acoustic standpoint, since the higher the mean pressure of the coupling liquid, the greater will be the amplitude of the acoustic waves transmitted through the liquid. It will be recalled that the process of the invention contemplates use of acoustic waves of amplitudes equal to or exceeding what has been defined as acoustic formation-failure stress amplitude, or of amplitudes exceeding the endurance limit, and this amplitude can be attained most easily, with reasonably-sized wave generators, if the coupling liquid be maintained under a substantial hydraulic pressure. As already indicated, the hydraulic pressure may often be sufficient by use simply of a column of coupling liquid filling the well hole, but in cases wherein additional pressure is desired, the pressure may be elevated by means of a suitable source of pressure connected to the liquid column.

As indicated above, it is deemed preferable, even if not always essential, to employ a hydrostatic pressure on the coupling liquid which is less than "formation breakdown pressure." This is for the reason that sustained hydraulic pressure at the level of the formation breakdown pressure actually lifts the formation, and tends to open up wide fissures through which the hydraulic liquid can race away. By keeping the hydrostatic head below formation breakdown pressure, this undesirable condition is avoided. Even if the level of formation breakdown pressure is periodically exceeded by the transmitted acoustic pressure wave during the positive pressure half-cycles of the wave, the tendency is not to bodily lift the overburden (because the formation depth is large relative to a wavelength), but rather to set up a periodic stress which overstrains the rock and leads to its failure. The preferred condition, i.e., a hydraulic pressure less than formation breakdown pressure, can be established by first pumping liquid down the well hole at a fast rate until formation breakdown pressure is attained, made known at the ground surface by a sudden drop in pressure and/or a suddenly increased flow rate. This condition simply means that at some locality along the exposed formation, the hydraulic pressure has equalled or exceeded formation breakdown pressure, a large crack or fissure has been opened up, and the injected liquid is racing away. Having determined the value for formation breakdown pressure, the hydraulic pressure on the liquid can then be dropped to and maintained at any desired fraction thereof.

As earlier noted, it is desired to subject the formation to acoustic waves above a certain threshold amplitude for formation failure by elastic fatigue failure, and to attain this amplitude, which is quite high, and difficult to reach, I prefer to employ an acoustic wave generator having both a high energy delivery rate, and a high output or radiation impedance, i.e., a high ratio of force to velocity at the point of drive of the liquid and/or formation by the generator.

With reference to the matter of proper positioning of the sound wave radiator relative to the formation to be fractured, several factors of interest are to be noted. To begin with, an acoustic wave radiator exerts its acoustic wave fracturing effect throughout a much more localized and concentrated region than is the case with the hydraulic system of fracturing. Accordingly, the present process contemplates a progressive lowering of the wave radiator to cover a vertically extended production interval. If the radiator should pass a region where a large old fracture exists, of the type that gives difficulty in hydraulic fracturing owing to racing away of hydraulic liquid faster than it can be pumped when such fracture is opened up by hydraulic pressure equal to formation breakdown pressure, the wave energy will not be diverted and concentrated into such fracture, because such a fracture presents, in effect, a wave guide of relatively high acoustic impedance for the pulses which enter and travel therealong. It is accordingly incapable of dissipating the available acoustic energy to the detriment of exposed areas of formation adjacent thereto.

Another feature of interest in the acoustic system is a tendency for an acoustic wave to remain within a medium bounded by other mediums of different acoustic impedance. For instance, when the wave radiator passes a particular bed in the oil bearing strata, the wave tends to stay within such bed and to travel radially outward therein, the bounding planes of the layers on each side acting to reflect incident waves, and so giving a wave guide effect. The result is that each layer of the formation is treated separately and generally within itself, so that fracturing tends to consist of a number of individual fractures distributed within a given bed as such bed is passed by the radiator. It is especially important to take note of the fact that the hydraulic coupling liquid does not necessarily, in the acoustic fracturing system, tend to race away as soon as a new crack is developed, because the hydraulic pressure can be held below hydraulic formation breakdown pressure, and the tendency to lift the formation and open up wide cracks is thus avoided in favor of forming a large number of fractures, adequate to form good petroleum drainage channels but incapable of interfering materially with the acoustic fracturing process. It is of equal importance to note that such new fractures as are developed or such cracks as are passed by the radiator do not interfere with acoustic wave transmission into the formation, since the acoustic waves are conscious only of the acoustic impedance presented by the formation, and adjacent cracks are of sufficient acoustic impedance as to have no material adverse effect. The location of the fracturing activity is easily controllable simply by positioning of the wave radiator opposite the region to be fractured. The present system, accordingly, has no need of pack-off as is required with the hydraulic fracturing process. For similar reasons, the present system is particularly well suited to the progressive and continuous treatment of long intervals of formation.

The fracturing effect of acoustic waves of high energy density may be understood by considering the extreme accelerations imparted to the coupling liquid and the formation. Taking the idealized case of a plane wave radiator (for the sake of mathematic simplicity) and investigating the acceleration "$a$" which will be given to the particles of an adjacent body of coupling liquid by such wave, there exists the relation $$p = \rho c u$$

where $p$ is the pressure amplitude of the wave, $\rho c$ is the characteristic acoustic impedance per unit area for the medium ($\rho$=density, $c$=speed of sound), and $u$ is liquid particle vibration velocity. The particle acceleration is related to particle velocity $u$ by $$a = \frac{du}{dt} = \omega u$$

where (assuming a sinusoidal wave) $\omega = 2\pi$ times frequency. Then $$a = \frac{\omega p}{\rho c}$$

Assuming a wave radiator capable of generating a pressure wave of amplitude typical of the invention, e.g., $p=50$ atmospheres ($=50 \times 10^6$ dynes/cm.$^2$) $\rho c = 1.4 \cdot 10^5$ c.g.s. units, and $f=100$ c.p.s., and substituting, we find $a = 22 \cdot 10^4$ cm./sec.$^2 = 220g$ (approximately), $g$ being the acceleration of gravity. This means that the coupling liquid is accelerated against the walls of the well hole in the formation 100 times per second and with an acceleration of the order of two hundred and twenty times that of gravity. With any reasonable degree of coupling it is possible to impart sufficient cyclic acceleration to the formation to exceed the pull of gravity locally so that the local formation literally "floats apart in space" because the return wave is never as great as the outgoing wave. The above analyzed accelerations, of course, also impart high stress fatigue conditions.

The invention will be further described with reference to the accompanying drawings showing a selected illustrative embodiment thereof, and in which.

Figure 1:
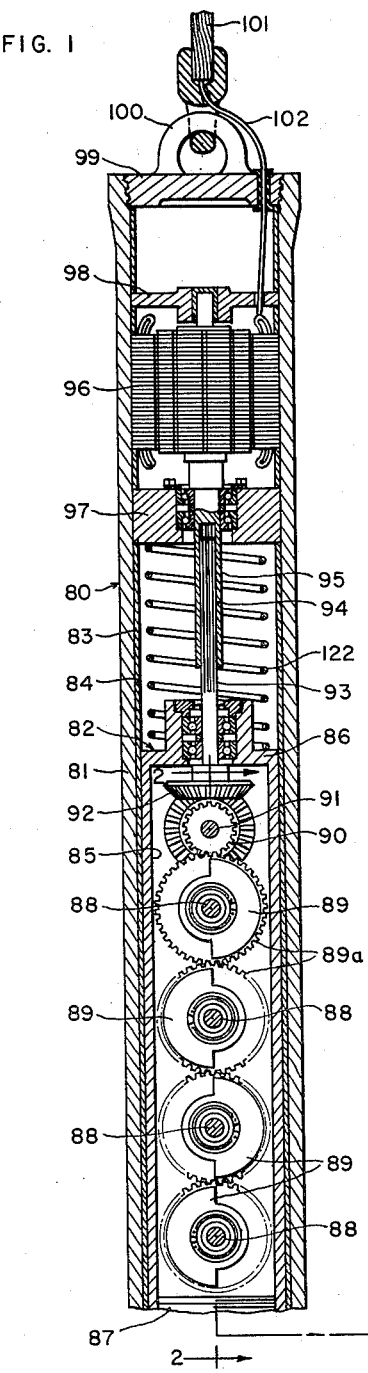
FIG. 1 is a longitudinal sectional view, broken into two parts, and with sections broken away, of a preferred embodiment of the invention.
Figure 1:
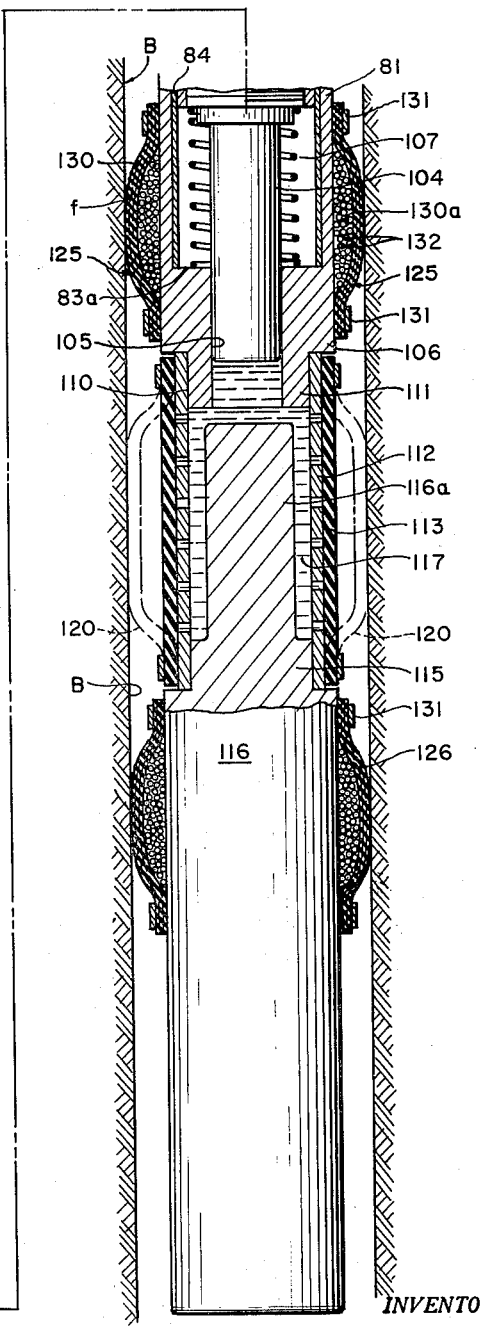

Referring now to the drawings, a vibration generator is designated generally by numeral 80, and comprises a tubular housing 81 containing a vertically oscillatory vibrator 82 of an unbalanced rotor type. The housing 81 has a bore 83 extending downwardly from its upper end to a shoulder at 83a, and fitted therein is a liner sleeve 84. The vibrator 82 comprises a tubular housing 85 having an integral upper end wall 86 and a threaded bottom closure plug or wall 87. Enclosure therein, and rotatably mounted on transverse shafts 88 set solidly into the walls of the housing 85, are vertically spaced unbalanced (eccentrically weighted) rotors 89. The rotors 89 are mounted on shafts 88 by means of suitable bearings such as indicated at 88a, and are provided about their peripheries with intermeshing spur gears 89a, as shown. The spur gear for the uppermost rotor is driven through a pinion 90, shaft 91 and bevel gear 92 from a vertical shaft 93 journalled in suitable bearings carried by the upper end portion of the housing 85, as illustrated, and the shaft 93 has a splined connection at 94 with a hollow drive shaft 95 extending downwardly from electric drive motor 96. The motor shaft is journalled below the motor by suitable bearings carried by a transverse wall 97, and above the motor by a bushing mounted in transverse wall 98. The upper end of the exterior housing 81 is closed by plug 99, furnished with bail 100 suspended from lowering cable 101 containing electric conductor 102 leading to motor 96. The apparatus will be understood to be lowered into a well bore B on this cable 101. It is also to be understood that the well bore is preferably to contain a coupling liquid, not shown, in which the apparatus is immersed, and which acoustically couples the apparatus to the formation, or cooperates in such coupling.

The plug or wall 87 at the bottom of vibrator case 82 carries a downwardly extending plunger rod 104 which is fitted for reciprocation within a bore 105 formed in the lower end portion 106 of the housing 81. A coil compression spring 107 is confined in the space inside the housing 81 between the shoulder 83a and the bottom wall 87 of the vibrator, and yieldingly supports the vibrator normally in the position illustrated. The lower end portion 106 of housing 81 is reduced in diameter, as indicated at 110, and fitted tightly over the lower extremity 111 of member 106 is a perforated metal sleeve 112, over which is fitted a heavy elastic sleeve 113, preferably composed of heavy rubber. The perforated sleeve 112 and expansive sleeve 113 are fitted at their lower end over a reduced annular portion 115 of a lower body of rod 116, as shown, a plug 116a, spaced inside sleeve 112, extending upwardly within said sleeve to nearly the bottom end of member 111. The remaining annular cavity or space 117 between the plug member 116a and the perforated sleeve 112, as well as above plug 116a and in the bore 105 below the plunger rod 104, is filled with a suitable liquid, preferably oil. Downward displacement of the vibrator 82 below the position illustrated in the drawing results in displacement of the liquid body in bore 105 in a downward direction ahead of the plunger 104, and of the liquid in cavity 117 in a radially outward direction, causing the elastic sleeve 113 to bulge. Assuming the presence of liquid in the well bore around the tool, the expanding sleeve 113 transmits a corresponding expansive force to the walls of the well bore through the intervening liquid layer. In some cases, the sleeve 113 may expand sufficiently, as indicated by the dot-dash lines 120, as to engage and expand the walls of the well bore B, but this is not essential since intervening liquid in the bore around the device is fully capable of transmitting the necessary expansive force to the well bore, without the necessity of such extreme distention of the sleeve 113.

Flexible, resilient collars or packers 125 and 126 are preferably, though not essentially, placed on the tubular housing 81 and rod 116, respectively, immediately above and below the sleeve 113. These collars or packers engage the wall of the well bore and function as blocking impedances which prevent dissipation of acoustic wave energy up and down the well bore. In the preferred embodiment here illustrated, each of these collars 125 and 126 comprises a flexible molded rubber body of the general form illustrated, forming an annular wall 130 which fits and is secured at the top and bottom to the member 81 or 116, as the case may be, as by means of suitable band clamps as indicated at 131. The rubber walls 130 are preferably furnished with longitudinally extending reinforcing fabric f, as indicated. Between the upper and lower band clamps, each of these walls 130 is formed on the inside with an annular cavity or space 130a, and such annular space is filled with small metal pellets 132, such as shot or small ball bearings.

The packer structures thus provided function as very effective acoustic wave blocking impedances. The gravity effect of the shot inside the rubber walls 130 causes the packers to expand radially into a fairly intimate engagement with the well bore. This is so notwithstanding well bore irregularities, because the fluid shot accommodates itself readily to such irregularities. When the device is in operation, the vibration causes the shot to settle, and thereby to expand the packer into tight engagement with the walls. Nevertheless, the entire assembly can easily be moved up or down the well bore, for the reason that the shot will always "give" readily to accommodate any such motion.

Acoustically speaking, the packers furnish an effective blocking impedance, preventing dissipation of wave energy from the site of generation either up or down the well hole.

In operation, the unbalanced rotors 89 of the vibrator driven from drive motor 96 generate a vertically directly-alternating force. These unbalanced rotors 89 are so phased with relation to one another that all of their unbalanced weights move up and down in synchronism with one another. The result is that the vertical components of force owing to rotation of the rotors are in phase and additive, the resultant vertically-directed alternating force being transmitted to the vibrator housing through the mounting shafts 88, and thence to the plunger 104. In the illustrative embodiment, there are four of the unbalanced rotors 89, and in the gearing arrangement shown, two of these rotors turn in one direction and two turn in opposite direction. Lateral components of force generated by these rotors are therefore balanced out. When the resultant force is in the downward direction, the vibrator housing moves downward against the supporting influence of the spring 107 and against the liquid body in the cavity 117, expanding the sleeve 113 as described above. When the force of the vibrator reverses, the vibrator housing moves upwardly, under the influence of the upwardly-directed force, together with the force of the spring 107. The weight of the vibrator prevents it from being overthrown in the upward direction, but to assure controlled operation between predetermined limits, an additional coil spring 122, placed between the wall 97 and the upper end of the vibrator housing, can be used if desired. On the upstroke of the vibrator, the plunger 104 is of course elevated, drawing the previously displaced liquid back into cavity 117 and bore 105, and so causing a contraction of the sleeve 113.

The resulting operation will be seen to be a cyclic expansive force application to the walls of the well bore, either directly applied, or through intervening coupling liquid, applied at the frequency of operation of the vibrator, causing generation of elastic deformation waves within the formation. A vibrator of the type illustrated is capable of the very powerful force application, and powerful acoustic waves are thus generated and radiated into the formation. It will be seen that while, for this case, the primary operation may optionally comprise direct periodic force application to the walls of the well bore, the use of a column of well bore liquid is still important with this form of apparatus, in that it fills into fractures as they are developed, and in that acoustic waves can be generated in the liquid surrounding the region of the expansive and contractive sleeve 113 and extending into such fractures in the formation, to be thus transmitted to newly exposed surface areas of the formation.

To practice the process of the invention in its preferred form, a suitable coupling liquid is first introduced into the well bore. To obtain the desired hydrostatic pressure, this coupling liquid may entirely fill the well bore. The column of liquid may be placed under a pressure higher than column pressure by coupling in a source of external pressure at the ground surface, as mentioned in my aforementioned parent application. Preferably, however, the hydrostatic head in the region to be fractured is less than hydraulic formation breakdown pressure. The coupling liquid may be field crude oil, and may desirably contain a percentage of sand or thin solid material in suspension in order to increase its specific acoustic impedance and thereby improve acoustic coupling between the sound wave radiator and the formation.

To carry out the process of the invention characterized by use of an asymmetric acoustic wave form, the wave generator is designed for a travel of piston 104 of sufficiently great amplitude, and therefore acceleration, at its operating frequency, as to cause separation of the piston from the liquid body on the up-stroke, whereby a condition of cavitation is brought about, and whereby, on the subsequent downstroke, a shock wave is generated having a peak positive amplitude much greater than the amplitude of the sine wave which would be generated if the liquid were not cavitated. It will be obvious that the desired high amplitude piston travel is obtainable simply by using a generator designed to produce the necessary magnitude of alternating force. It will also be obvious that the separation of the piston from the liquid body occurs after the sleeve 113 has contracted sufficiently to engage the perforated sleeve 112, when the volume of the cavity 117 becomes larger than the liquid body.

This characteristic cyclic acoustic phenomena, consisting in repeated cavitation and shock waves, produces an asymmetrical pressure wave form characterized by periodic steep-fronted high pressure peaks of short time duration, alternating with negative pressure swings of long time duration and moderate amplitude. Such a non-linear wave form is exceptionally well suited to the special problem of formation fracturing, its high pressure peak including high frequency components which cause high concentrated stresses greatly exceeding the endurance limit of the rock. The high pressure effect of such shock waves is primarily exerted against the region of the well bore wall immediately surrounding the sleeve 113. Cracks developing in the rock under this action fill with fluid, and form high impedance wave guides for the steep-front shock waves, with the result that the shock waves run into cracks and exert forces on the sidewalls thereof like a succession of travelling wedges. Calculations show that shock waves can be generated with a peak amplitude of 50,000 p.s.i.

Shock waves owing to cavitation are known to attain tremendous pressures, and offer one of the most effective solutions to the problem of producing asymmetrical waves of extremely high peak amplitude. Other usable methods of asymmetrical wave generation are of course available, and this species of the invention is accordingly not limited to cavitation generation of the wanted high amplitude asymmetrical waves, though the cavitation method is thought to be probably the most powerful method that can be found. The use of the asymmetrical wave form in the present invention facilitates fracturing by creating stresses far beyond the endurance limit of the formation.

Another advantage of such asymmetrical wave generation is that large amounts of power can be put into the wave system even though the mean pressure be moderately low. The energy in the positive peaks is limited only by the generating apparatus. It can thus be seen that by use of a wave generator such as here disclosed, it is possible to operate with a much lower hydraulic pressure on the well fluid than is needed with a simple sinusoidal wave system; and of course this hydraulic pressure can be very much lower than hydraulic formation breakdown pressure.

Another obvious advantage of the present generator is that it can be moderately light in weight, thus imposing a much less strain on the cable, which is a very important consideration in deep wells.

Figure 2:
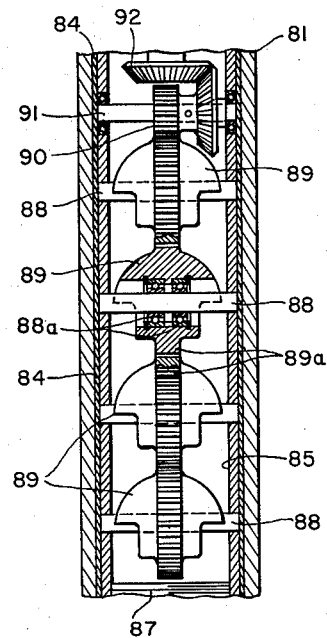
FIG. 2 is a section taken on line 2—2 of FIG. 1.
Figure 3:
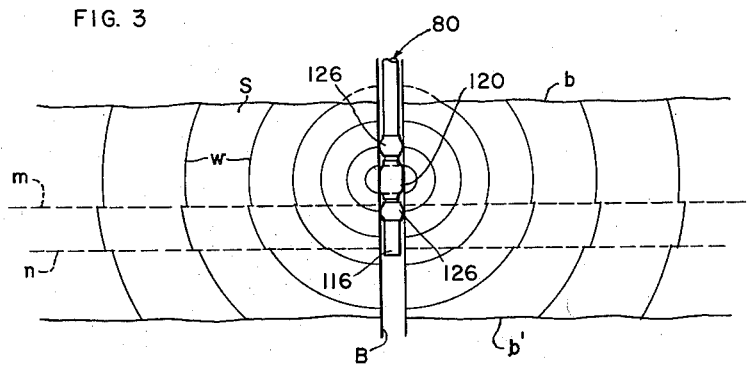
FIG. 3 is a diagrammatic view showing a section of formation surrounding a well bore, with the apparatus of FIGS. 1–2 situated therein.

In treating a given production zone, the sound wave generator or radiator may be moved progressively the full length thereof. FIG. 3 shows somewhat diagrammatically a typical application, the apparatus of FIGS. 1 and 2 being shown as positioned opposite an oil bearing formation or bed S between two joints or boundaries $b$ and $b'$ beyond which are assumed to be beds of differing character. The two planes indicated in dotted lines at $m$ and $n$ represent minor bedding planes within the more or less homogeneous production formation or stratum S, and the rock material therebetween may be understood to differ to only a small extent from the remaining portions of the bed S. In other words, the material between the planes $m$ and $n$ may be thought of as having been laid down under slightly different conditions, so that its wave transmission character may be generally similar to that of the remainder of the bed, but still somewhat different therefrom.

The waves generated and propagated within the bed S as a result of the operation of the sound wave generator are indicated by the circles $w$ seen to radiate from the region of the generator sleeve 112. Waves so radiated into the stratum S between the fractures or bed planes $b$ and $b'$ will be understood to be very largely reflected at said planes because of the substantial acoustic discontinuity caused thereby, and so kept primarily within the main stratum S which is under direct treatment, being propagated radially outward between said planes serving as wave guide boundaries. Because of the assumed close similarity of the rock material between the planes $m$ and $n$ to the remaining material of the bed S, together with an assumed initial bonding of the entirety of the material between the planes $b$ and $b'$, the waves radiating from output member 112 are propagated horizontally outward throughout the entirety of the rock material between the planes $b$ and $b'$.

It will thus be seen that the bed S may undergo cyclic deformation movements which are not propagated appreciably beyond the planes $b$ and $b'$, so that the layer S is moved and worked relative to the layers beyond the planes $b$ and $b'$, thus opening up or fracturing the formation (breaking the material bond) along said planes. The material of the bed S, subjected to the described high amplitude cyclic deformation movements, fractures by elastic fatigue failure. In addition, because of inherent weakness of the bond along such bedding planes as $m$ and $n$, as well as because of differences in the speed of sound in the material between and outside of the planes $m$ and $n$, as indicated in FIG. 3, fractures are developed along the planes $m$ and $n$. The forces operating to produce this effect will be understood when it is realized that the wave transmitted through the rock above and below the plane $m$, for instance, may have a phase difference, meaning that the elastic deformation movements on opposite sides of the separation plane are somewhat out of phase. This condition results in a shearing force along the separation plane, with resulting tendency to fracture the bond. As soon as a fracture should develop along such a plane as $m$, the radiated waves are then guided between the new boundaries $b$ and $m$, for example, with materially enhanced energy concentrations, and still greater and more extensive fracturing force. The vibration generator being gradually lowered, the layers formed by fracturing along such planes as $m$ and $n$ will be seen to be locally treated in succession. The process thus progresses, with greater energy concentration as the layers open up, always tending toward further multiplication and extension of the desired fracturing.

The apparatus disclosed herein may also be used for generation of a substantially sinusoidal acoustic wave output, rather than the positively peaked asymmetric wave, merely by designing for insufficient amplitude of piston travel for separation of the piston from the liquid during its stroke. Obviously, this is accomplished by using a reduced alternating force amplitude, obtained by lessened unbalanced weight in the generator rotors.

Attention is here directed to the fact that the wave generator employed is not of the type giving intermittent impacts, with some device or member then vibrating at its natural frequency in a damped or dying wave pattern. By contrast, I employ a continuous wave generator, whose characteristic is that power is supplied on each cycle of the wave. Such continuous wave generation is necesary to deliver sufficient energy to the formation to satisfy the energy expenditure required for formation fracturing.

It will be evident from the above that various forms of apparatus may be employed in carrying out the invention. The primary requirement is a form of acoustic wave generator so powerful and a form of coupling to the formation so effective, that the acoustic waves set up in the formation establish what has been termed herein "acoustic formation-failure stress amplitude," denoting an amplitude such as overstresses the formation, i.e., stresses it beyond its endurance limit, and leads to its breakdown by fatigue failure. Rock can of course sustain an acoustic wave indefinitely without sign of fatigue failure provided the region of overstress is not approached. The present invention deals only with situations in which the waves are so highly powerful as to place the rock, or a rock bond, periodically in a condition of stress beyond its endurance limit, with fatigue failure and fracturing as the consequence.

Some of the advantages and characteristics of the acoustic process of formation fracturing may be summarized as follows: The system does not positively require pack-off, though such may be used. The apparatus can be run in on a wire line. Continuous, progressive treatment of long intervals of formation is accomplished. The actual hydraulic pressure of the fluid column need not be as high as the formation breakdown pressure, and therefore vast quantities of fluid are not injected into existing fissures or highly permeable regions. The acoustic system can attain very high fracturing pressures where needed. Finally, the acoustic wave system subjects the rock to a rapidly repeated stress of amplitude exceeding its endurance limit, and in the preferred practice, the repeated stress wave is shaped to form a high amplitude, steep-fronted shock pulse. The rock material is thus forced to undergo rapidly repeated stresses of a nature and magnitude which it cannot endure, and it shortly breaks up by reason of elastic fatigue failure.

I claim:

1. The process of fracturing oil bearing formation surrounding a well hole, that includes: generating a non-linear peaked asymmetric pressure wave of steep wave front in a liquid body within said well by periodically inducing cavitation in said body of liquid, and transmitting said pressure wave to the formation surrounding the well hole, whereby to propagate in the formation a wave of corresponding wave form and of amplitude substantially exceeding the endurance limit of the formation.

2. The process of fracturing oil bearing earthen formation surrounding a well bore containing a body of liquid, that comprises: locating in said body of liquid in the well bore, opposite the formation to be fractured, an acoustic wave generator comprising a cylinder and reciprocating piston, contacting an end of said piston and the wall surface of the well bore by faces of intervening liquid comprising a wave transmission path therebetween, and reciprocating said piston at an amplitude of acceleration causing cavitation of said liquid and consequent generation of non-linear shock waves which are transmitted to the wall surface of the well bore through said liquid and which are propagated in the formation at a peak amplitude exceeding the endurance limit stress thereof.

3. An apparatus for producing acoustic frequency oscillations in a liquid in a well bore, comprising: a body adapted to be suspended in the liquid in the well bore, a vibrator mounted on said body for relative vibration with respect thereto, a vibratory wall driven by said vibrator, and means forming a closed chamber holding a confined body of liquid of fixed volume adjacent said vibratory wall, in such manner that said vibratory wall alternately advances and recedes with reference to said body of liquid, to create pressure waves in said body of liquid, said chamber including a flexible expansive and contractive wall arranged for expansive and contractive vibration in response to pressure waves in said body of liquid, and means arresting contraction of said flexible wall prior to maximum recession of said vibratory wall.

4. An apparatus for producing acoustic frequency oscillations in a liquid in a well bore, comprising: a body adapted to be suspended in the well bore, a vibrator mounted on said body for relative longitudinal vibration with respect thereto, a piston means on an end of said vibrator, a second body connected to and positioned in alignment with the first-mentioned body and spaced from but disposed in end to end opposition with respect to said piston means, a rigid perforated sleeve connected at one end to said first body around said piston means, and at the other end to said second body, a flexible expansive and contractive sleeve fitted over and closely adjacent said rigid perforated sleeve, and forming an expansive and contractive chamber between said bodies and adjacent said piston means, and a body of liquid in said chamber, said perforated sleeve being engageable by said flexible sleeve during recession of said piston means.

5. An apparatus for producing acoustic frequency oscillations in a liquid in a well bore, comprising: a body adapted to be suspended in the well bore, a vibrator mounted on said body for relative longitudinal vibration with respect thereto, a piston means on an end of said vibrator, a second body connected to and positioned in alignment with the first-mentioned body and spaced from but disposed in end to end opposition with respect to said piston means, a flexible sleeve fitted at opposite ends to said first and second bodies and forming an expansive and contractive chamber between said bodies exposed to said piston means and to an opposed end portion of said second body, a body of liquid filling said chamber, and flexible collars fitted on said first and second bodies above and below the space therebetween for restricting the annuli between said bodies and the wall of the well bore for substantially confining acoustic waves radiated from the apparatus from between said bodies to a limited extent of the well bore.

6. The subject matter of claim 5, wherein each of said collars comprises a flexible wall defining a chamber between it and the body to which it is fitted, and a loose body of small heavy particles contained within said chamber.

References Cited by the Examiner
UNITED STATES PATENTS

| | | | |
|---|---|---|---|
| 2,062,151 | 11/36 | Weatherby | 175—1 |
| 2,281,751 | 5/42 | Cloud | 166—177 X |
| 2,361,558 | 10/44 | Mason | 166—43 |
| 2,433,746 | 12/47 | Doll | 166—177 X |
| 2,580,716 | 1/52 | Balamuth | 51—59 |
| 2,670,801 | 3/54 | Shereborne | 166—177 X |
| 2,675,080 | 4/54 | Williams | 166—187 |
| 2,680,485 | 6/54 | Bodine | 166—177 |
| 2,700,422 | 1/55 | Bodine | 166—177 |
| 2,798,557 | 7/57 | Sewell | 166—42 |
| 2,806,533 | 9/57 | Fleck | 166—177 X |
| 2,866,509 | 12/58 | Brandon | 166—177 |
| 2,871,943 | 2/59 | Bodine | 166—42 |

CHARLES E. O'CONNELL, *Primary Examiner.*